United States Patent

[11] 3,615,434

[72] Inventors Robert C. McConkey; Thomas M. Laakso; Cornelius C. Unruh, all of Rochester, N.Y.

[21] Appl. No. 773,322
[22] Filed Nov. 4, 1968
[45] Patented Oct. 26, 1971
[73] Assignee Eastman Kodak Company Rochester, N.Y.

[54] PHOTOSENSITIVE ELEMENT AND PROCESS EMPOLYING A LIGHT-SENSITIVE MUCONIC ACID POLYESTER
13 Claims, No Drawings

[52] U.S. Cl. .......... 96/28, 96/35.1, 96/86 P, 96/87 R, 96/115 R, 260/47 C, 260/75 UA
[51] Int. Cl. .......... G03c 11/12, G03f 7/10
[50] Field of Search .......... 96/35.1, 115 R, 86 P, 87, 88, 28

[56] References Cited

UNITED STATES PATENTS

| | | | |
|---|---|---|---|
| 2,759,820 | 8/1956 | Neugebauer et al. .......... | 96/115 X |
| 3,030,208 | 4/1962 | Schellenberg et al. .......... | 96/35.1 |
| 3,408,191 | 10/1968 | Jeffers .......... | 96/35.1 X |
| 3,429,949 | 2/1969 | Driscoll .......... | 96/35.1 X |

*Primary Examiner*—William D. Martin
*Assistant Examiner*—Mathew R. P. Perrone, Jr.
*Attorneys*—William H. J. Kline, James R. Frederick and Joshua G. Levitt

ABSTRACT: Polyesters prepared from a muconic acid and a diol are photosensitive and are useful in photographic processes including photothermographic transfer processes.

PHOTOSENSITIVE ELEMENT AND PROCESS EMPOLYING A LIGHT-SENSITIVE MUCONIC ACID POLYESTER

This invention relates to novel photosensitive polyesters and to photographic elements containing these polyesters.

It is known that certain photosensitive polymeric layers can be photopolymerized by exposure to visible or ultraviolet light to yield a pattern of hardened polymer which can be used in various ways in image reproduction. For example, the unhardened background areas can be removed and the residual hardened image used as a lithographic printing plate, or the relief can be used as a resist for etching the underlying support. Alternatively, the difference in tackifying point between the exposed and unexposed areas of the polymer can be used for image-wise toning with colored powders, for colloid transfer to an adjacent receiving surface, etc.

These operations are accomplished through such procedures as applying mechanical pressure, treating with solvents, and heating. So-called photothermographic processes, which involve the use of heat to increase the difference in surface adhesion between exposed and unexposed areas of light-sensitive polymeric coatings, are particularly attractive because they obviate the use of solvents or other wet chemical processing steps.

These photothermographic processes have other important advantages. They share the simplicity of conventional thermographic systems and have the additional merits of responding to ultraviolet and visible light and of correctly reproducing continuous tone, as well as line originals.

Many of the prior art light-sensitive photothermographic materials, however, do not provide sharp, high quality image reproductions. When transfers are made from a matrix to a receiving sheet, the temperature required to effect the transfer is often too high, and temperature control of tackiness too critical for a practical process. Ragged image structures, generally nonuniform transfer, poor reproducibility of multiple transfers and difficulty in separating the matrix from the receiving sheet often result from lack of control of tackiness.

Furthermore, certain of the prior art materials are associated with specific photothermographic processes, particularly processes requiring solvent treatment, and they do not operate effectively in all the various processes of photothermography.

Photographic processes can be improved by the elimination of processing steps and by improving image quality without increasing the number of processing steps. There is a need for stable, improved photothermographic compositions which will give crisp, high fidelity renditions of an original, which will provide uniform multiple transfers without complicated processing, which will operate effectively in the various forms of photothermography, and which can be used in new, improved, photothermographic processes that provide positive-to-positive transparencies and transparencies requiring fewer preparation steps.

Photothermographic compositions which have these desirable characteristics and which can be used to prepare high quality reproductions are described in Frank D. Allen, U.S. application Ser. No. 709,496, filed Feb. 29, 1968, which describes copolyesters prepared from at least two dicarboxylic acid moieties, at least one of which contains a light-sensitive grouping, and at least one diol moiety. The presence in the copolyester of an additional or modifying dicarboxylic acid moiety imparts to the copolyester variations in physical characteristics, such as crystallinity, glass transition temperature and tackifying temperature, which are important if the copolyester is to be used successfully in transfer processes. However, the need for a modifying dicarboxylic acid complicates the preparation of these copolyesters. Hence, it would be desirable if a polyester could be prepared which has physical properties which render it useful for photographic and photothermographic transfer processes but which avoids the need for a modifying dicarboxylic acid to obtain these properties.

Accordingly, it is an object of this invention to provide a novel photosensitive polyester which can be used in photographic and photothermographic transfer processes.

It is another object of this invention to provide a novel photosensitive polyester prepared from a single dicarboxylic acid reactant which can be used in photothermographic transfer applications.

It is yet another object of this invention to prepare photographic images by photothermographic transfer processes using these novel light-sensitive polyesters.

It is a further object of this invention to provide photographic elements which employ as the photosensitive component these novel light-sensitive polyesters.

The above and other objects of this invention will become apparent to those skilled in the art from the further description of this invention which follows.

In accordance with the present invention light-sensitive linear polyesters having physical characteristics which render them useful in photothermographic transfer applications are prepared by the condensation of a muconic acid, or its bisesters, with an organic diol. Polyesters of this invention have physical characteristics which render them highly suitable for use in photothermographic transfer processes. These light-sensitive polyesters are substantially nontacky at room temperature (20° C.) but have tackifying temperatures (i.e., the temperature at which the polyester becomes sensually tacky) of about 50 to 200° C. They have a glass transition temperature of less than about 35° C., and preferably less than about 5° C., and an inherent viscosity in the range of about 0.25 to 1.25. Glass transition temperature is that temperature at which the polyester changes from a molten state to a hard glass state. Inherent viscosity is a measure of the degree of polymerization of the polyester and a reflection of its molecular weight. The values of inherent viscosity used herein are determined at 25° C. from a solution of 0.25 grams of the polyester in one deciliter of a 50:50 by volume phenol:chlorobenzene solvent mixture, and are calculated according to the equation:

$$\eta_{inh} = \frac{ln(\eta_1 \eta_0)}{c}$$

where ηinh is inherent viscosity of the polyester, η is the viscosity of the solution, η is the viscosity of the solvent and c is the concentration in grams of polyester per deciliter of solution.

The polyesters of this invention are prepared by condensing a muconic acid, or its bisester, having the formula:

$$ROOC-\underset{R'}{\underset{|}{C}}=CH-CH=\underset{R'}{\underset{|}{C}}-COOR$$

where R is a hydrogen atom or a lower alkyl group of one to eight carbon atoms such as methyl, ethyl, propyl, butyl, pentyl, hexyl, octyl, and the like, and R' is a hydrogen atom or a methyl group, with an organic diol typically having the formula

HO-R''-OH where R'' is a divalent organic radical having about two to 20 carbon atoms such as a divalent hydrocarbon radical such as an aliphatic alkylene radical, e.g., a 2,2-dimethylpropylene radical, an arylene radical, e.g., a phenylene radical, a bisphenylene alkylene radical, a cycloalkylene radical, e.g., a norbornylene radical, a cyclohexylene radical, a 1,4-dialkylenecyclohexylene radical, a 1,4-dimethylenecyclohexylene radical, e.g.; an ether radical such as an -alkylene-0-alkylene-radical, an -alkylene-0-cyclohexylene-0-alkylene- radical, etc.; and the like. Exemplary diols that can be utilized in preparing the polyesters of the invention include: ethylene glycol, diethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2-bis(4-hydroxyphenyl)propane, norbornanediol, 1,4-cyclohexanedimethanol, 1,4-di-β-hydroxyethoxycyclohexane. Mixtures of such diols can also be used in preparing the present polyesters. Exemplary muconic acids are trans,trans-muconic acid; cis,trans-muconic acid, cis,cis-muconic acid, α, α'-trans,trans-dimethylmuconic acid, α, α'-cis,trans-dimethylmuconic acid, and α, α'-cis,cis-dimethylmuconic acid.

Typically the polyesters of this invention are prepared by an ester interchange reaction between the diol and a muconic acid ester. Useful catalysts for this reaction are titanium esters such as titanium isopropoxide and tetraalkyltitanate, strontium oxide, magnesium-titanium esters, and the like.

Although the polyesters of this invention prepared from muconic acid have physical properties which render them suitable for photothermographic transfer processes, the physical properties of the polyesters can be further modified if desired by substituting for up to 80 mole percent of the muconic acid reactant another modifying dicarboxylic acid reactant. Examples of such modifying dicarboxylic acids are succinic acid, adipic acid, azelaic acid, terephthalic acid, isophthalic acid, sebacic acid, fumaric acid, cinnamylidenemalonic acid, phenylenebisacrylic acid, etc.

Photosensitive compositions of the present invention can incorporate such known photographic addenda as sensitizers, pigmented dyes, color-forming compounds, plasticizers, and the like. For example, the present light-sensitive compositions can be sensitized with such materials as 6-methoxy-β-2-furyl-2-acrylonaphthone, Michler's ketone, Michler's thioketone, quinolizone, 2-chloroanthraquinone, 2,6-bis(p-azidobenzal)-4-methylcyclohexanone, thiazoles, pyrylium salts, thiapyrylium salts and the like sensitizers to obtain highly sensitized photothermographic compositions. Typical suitable sensitizers are described in French Pat. Nos. 1,086,257 and 1,089,290, and U.S. Pat. Nos. 2,610,120, 2,690,966, 2,670,285, 2,670,287, 2,670,286 and 2,732,301.

The present light-sensitive compositions can be coated on supports from solvents in accordance with usual practice. Such compositions are soluble in a number of organic solvents including chlorinated hydrocarbon solvents such as ethylene chloride, chloroform, dichloroethane, trichloroethane, and the like. In preparing the photothermographic elements of the invention, the light-sensitive compositions described above are coated on suitable photographic supports, including transparent as well as opaque supports, such as cellulose acetate film, polyestyrene film poly(ethylene terephthalate) film, metal sheets, glass, cloth, paper, polyethylene-coated paper, polypropylene-coated paper, or the like.

The photothermographic elements can incorporate a porous permeable overcoat such as is described in Dulmage et al. U.S. Pat. Nos. 3,260,612 and 3,387,974. Such overcoats comprise a porous layer, disposed on top of the light-sensitive polyester resin, which is permeable to the polyester resin material in its transferable state, and which meters and regulates the flow of the polyester resin material from the element to the receiving sheet, thereby permitting a greater number of more uniform copies to be obtained. Suitable porous permeable overcoats can be prepared from such materials as polyvinyl alcohol, gelatin, alumina fibrils, and the like. Their method of preparation and the manner in which they are employed are more fully described in the above-mentioned Dulmage et al. patents.

The resulting photosensitive element can be exposed imagewise to actinic radiation to cross-link the polyester coated thereon in the exposed areas in proportion to the amount of exposure to provide an imagewise pattern of high and low melting areas. The element can then be heated to a temperature between about 50 and 200° C., which is intermediate between the tackifying point of the unexposed and exposed areas, to soften or tackify the polymer in the unexposed areas. The softened polymer can then be toned or transferred to a receiving sheet under pressure and toned, transferred without toning if a pigment, dye or color-forming compound is incorporated in the pigmented layer and/or the receiving sheet, treated in a dye bath, allowed to transparentize in the unexposed areas, or crazed with a crazing solvent to opacify the unexposed areas. Alternatively, an image can be developed in the exposed photothermographic element of this invention by treatment with a solvent for the unexposed photosensitive composition which is a nonsolvent for the exposed material, to remove the composition from unexposed areas. Chlorinated solvents such as ethylene chloride are suitable for such development. Additionally, the photosensitive polyesters of this invention can be employed in photosensitive elements of the type described in Alsup U.S. application Ser. No. 723,918, filed Apr. 24, 1968, in which positive and negative images are developed from an element comprising a layer of polyester sandwiched between two supports by a photoadhesion process which utilizes the change in adhesive and cohesive forces between the polyester and the supports and within the polyester itself resulting from photoexposure.

Both transmission exposures and reflex exposures can be employed in the photothermographic transfer processes of the invention. In processes using reflex exposures, the photographic element is placed in contact with an original and light is passed from the source through the element to the original. In the image areas of the original, the light is absorbed and in the nonimage areas it is reflected back through the light-sensitive polyester composition, thus further exposing the nonimage areas. Right-reading or laterally reversed images can be obtained depending upon whether the back or the front of the light-sensitive element is in contact with the original.

The following examples are included for a further understanding of the invention.

Example 1 Preparation of Polyester from Dimethyl α, α'-trans-trans-Dimethylmuconate and 1,5-Pentanediol Thirty-five and eight-tenths grams (0.344 mole) of 1,5-pentanediol and 34 g. (0.172 mole) dimethyl α, α'-trans, trans-dimethylmuconate are weighed into a clean, dry 200 ml. sidearm standard tapered polymerization flask. The sidearm of the flask is fitted with a cork and the flask itself is fitted with a tube reaching the material in the bottom so that an inert gas would cover the reaction mixture during the first stage of heating. The polymerization flask is also fitted with a short standard tapered Vigreux column with sidearm to provide reflux during the first stage of heating, but only enough reflux to allow the alcohol formed during the reaction to distill off while most of the glycol returns to the reaction mixture. All the reactants are melted in a silicon oil bath at 235° C. in subdued light under a helium atmosphere and mixed well in the liquid state before 2 drops of pure titanium isopropoxide are added to start the transesterification reaction. The reactants are heated at 235° C. for 3 hours after the alcohol begins to distill off. At the end of this time, the Vigreux column, inert gas tube, and cork are removed and the side arm connected to a vacuum pump through two dry ice traps. A stirrer, fitted with a ball joint, is inserted into the reaction melt to stir the polymer as the pressure is gradually lowered to 0.08 mm. Hg. The polymer is stirred under 0.08 mm. Hg. pressure for an additional 30 minutes at which time it is a viscous amber melt. The light colored crystalline product has a melting range of 82° to 90° C., an inherent viscosity of 1.02 in a 50:50 phenol:chlorobenzene mixture, and a glass transition temperature of −6° C.

Examples 2–10 Preparation of Polyesters

Using the procedure described in example 1 polyesters are prepared from the reactants listed below in table I. The reaction time for the first stage reaction is the length of time the reaction mixture is heated after alcohol begins to distill off, and for the second stage reaction is the length of time the reaction mixture is stirred under vacuum. Inherent viscosity is measured in a 50:50 mixture of phenol:chlorobenzene and is calculated as indicated above on page 4.

TABLE I

| Ex. | Reactants: Acid | Reactants: Diol | Reaction time: 1st stage, hr. | Reaction time: 2nd stage, min. | Melting Range (° C.) | Inherent viscosity | Tg (° C.) |
|---|---|---|---|---|---|---|---|
| 2 | Dimethyl α,α'-trans, trans-dimethylmuconate (0.2 mol) | 1,4-butanediol (0.344 ol) | 3 | 25 | 95–105 | 0.98 | +7 |
| 3 | Dimethyl α,α'-trans, trans-dimethylmuconate (0.2 mol) | Neopentyl glycol (0.344 mol) | 3 | 65 | 105–118 | 0.86 | +36 |
| 4 | Dimethyl α,α'-trans, trans-dimethylmuconate (0.05 mol) plus diethylcinnamylidene malonate (0.15 mol). | 1,4-butanediol (0.344 mol) | 3 | 50 | 130–142 | 1.16 | ------- |
| 5 | Dimethyl α,α'-trans, trans-dimethylmuconate (0.15 mol) plus dimethylterephthalate (0.05 mol). | do | 3 | 10 | 80–165 | 0.92 | +10 |
| 6 | Dimethyl α,α'-trans, trans-dimethylmuconate (0.2 mol) | 1,9-nonanediol (0.344 mol) | 2 | 27 | 70–85 | 0.98 | −33.5 |
| 7 | Dimethyl α,α'-trans, trans-dimethylmuconate (0.08 mol) plus diethylsuccinate (0.12 mol). | 1,4-butanediol (0.344 mol) | 1.5 | 12 | 60–85 | 0.72 | −37 |
| 8 | Dimethyl α,α'-trans, trans-dimethylmuconate (0.12 mol) plus diethylsuccinate (0.08 mol). | 1,5-pentanediol (0.344 mol) | 3 | 30 | 65–85 | 1.09 | −35 |
| 9 | Dimethyl α,α'-trans, trans-dimethylmuconate (0.1 mol) plus diethyl-p-phenylene diacrylate (0.1 mol). | 1,9-nonanediol (0.344 mol) | 3 | 15 | 70–170 | 0.67 | ------- |
| 10 | Dimethyl α,α'-trans, trans-dimethylmuconate (0.12 mol) plus dimethyladipate (0.08 mol). | 1,5-pentanediol (0.344 mol) | 3 | 20 | 25–75 | 0.70 | ------- |

Example 11 Sensitization of Polyesters

The photographic speed and spectral response of polyesters prepared in the preceding examples are determined by the procedure described in L. M. Minsk et al., "Photosensitive Polymers. I. Cinnamate Esters of Poly(vinyl Alcohol) and Cellulose," Journal of Applied Polymer Science, Vol. II, No. 6, pp. 302–307 (1959). The sensitivity value is a measure of the relative speed of the polyester when exposed to ultraviolet or visible light, such as from a white flame carbon arc under glass compared with the speed of unsensitized polyvinyl cinnamate as a standard. The speed of the standard is taken as 2.2. The sensitizers tested are:

A. 3-Methyl-2-methylmercaptothiocarbonylmethylenebenzothiazoline

B. 1-Methyl-2-benzoylmethylene-β-naphthothiazoline

C. 2,6-Bis(4-ethoxyphenyl)-4-(4-n-amyloxyphenyl) thiapyrylium perchlorate

D. Michler's Ketone

TABLE II

| Sensitizer | Polyester of Example 1 | 2 | 3 | 4 |
|---|---|---|---|---|
| None: | | | | |
| Sensitivity value | 80 | 20 | 20 | 710 |
| Spectral sensitivity (mμ) | 270–300 | 270–300 | 270–330 | 270–330 |
| A: | | | | |
| Sensitivity value | 1,400 | 1,400 | 2,500 | 3,200 |
| Spectral sensitivity (mY) | 270–470 | 270–500 | 270–500 | 270–500 |
| B: | | | | |
| Sensitivity value | 1,400 | 1,400 | 1,800 | 2,800 |
| Spectral sensitivity (mY) | 270–460 | 270–450 | 270–460 | 270–470 |
| C: | | | | |
| Sensitivity value | 250 | 1,800 | 1,800 | 3,200 |
| Spectral sensitivity (mY) | 270–560 | 270–560 | 270–580 | 270–580 |
| D: | | | | |
| Sensitivity value | 140 | 180 | 3,600 | 710 |
| Spectral sensitivity (mY) | 270–430 | ------- | ------- | ------- |

Example 12 Preparation of Lithographic Elements

Each of the polyesters prepared in examples 9 and 10 are dissolved in tetrachloroethane to form 5 percent solutions. Each of these solutions is diluted to 2 percent with 1,2-dichloroethane. Unsensitized samples of each solution, and samples of each solution sensitized by the addition of 0.1 percent of 2,6-bis(4-ethoxyphenyl)-4-(4-n-amyloxyphenyl)thiapyrylium perchlorate are whirl coated on grained aluminum supports. The resulting plates are exposed through photographic line and half-tone negatives to a high pressure mercury source (GE UVIARC Model 6111 Type UA 11B 1200–watt high pressure mercury lamp rated at 75-watts per inch of bulb) on an Ozalid "Ozamatic" diazo printer. The unsensitized plates require about 30 seconds, and the sensitized plates about 4 seconds for adequate exposure. The plates are developed with 1,2-dichloroethane and can then be either dyed, or etched with a desensitizing etch and then inked with a greasy lithographic ink to form negative-working lithographic printing plates.

Example 13 Preparation and Use of a Photothermographic Element

A sample of the polymer prepared in example 6 is dissolved in ethylene chloride and sensitized by the addition of 0.5 percent of 2,6-bis(4-ethoxyphenyl)-4-(4-n-amyloxyphenyl)thiapyrylium perchlorate, based on the weight of the polyester. The sensitized polymer is then coated on a poly(ethylene terephthalate) film support at a dry weight of about 0.1 to 0.2 g/ft$^2$. The coating is exposed through a 0.05 density increment step tablet. A minimum exposure of 8½ seconds to a 1100–watt tungsten source at a distance of about 1 inch from the polymer is required to cross-link the coating sufficiently to prevent transfer. The coating is placed in contact with a highly calendered bond paper and passed through a pair of transfer rolls, which had been heated to 120° C., under a pressure load of 25 pounds per linear inch. When the two sheets are separated, the unexposed portions of the coating transferred to the receiver paper. The transferred image is then toned by dusting with a xerographic toner which adheres to the semitacky transferred polymer. The developed image is fixed by heating to fuse the xerographic toner.

Example 14 Preparation and Use of a Photothermographic Element 1

An element is prepared and used in the same manner described in Example 13 except that the polymer of example 1 is coated on a poly(ethylene terephthalate) film base which had been subcoated with poly(methyl acrylate-co-vinylidene chloride-co-itaconic acid) (Weight percent ratios = 14.7:83.2:2.0). When exposed and developed as in example 13, similar results are obtained.

Example 15 Preparation and Use of a Photothermographic Element

A photothermographic element is prepared and used as described in example 13 employing the polyester of example 2. The results are essentially the same as described in example 13

The invention has been described in detail with particular reference to certain preferred embodiments thereof, but it will be understood that variations and modifications can be effected within the spirit and scope of the invention.

What is claimed is:

1. A photosensitive element comprising a support on which is coated a layer of a photosensitive composition comprising a light-sensitive linear polyester condensation product of an organic diol reactant and a muconic acid reactant having the structural formula:

$$\mathrm{ROOC{-}\underset{\underset{R'}{|}}{C}{=}CH{-}CH{=}\underset{\underset{R'}{|}}{C}{-}COOR}$$

where R is selected from the group consisting of hydrogen atoms and lower alkyl groups and R' is selected from the group consisting of hydrogen atoms and methyl groups, wherein the polyester has an inherent viscosity in the range 0.25 to 1.25 and a sensitizer.

2. A photosensitive element as defined in claim 1 wherein the diol reactant has the formula:

HO-R''-OH wherein R'' is a divalent organic radical having about two to 20 carbon atoms.

3. A photosensitive element which comprises a support having thereon a layer of a photosensitive composition comprising a light-sensitive linear polyester condensation product of a muconic acid reactant having the structural formula:

$$ROOC-\underset{R'}{\underset{|}{C}}=CH-CH=\underset{R'}{\underset{|}{C}}-COOR$$

where R is selected from the group consisting of hydrogen atoms and lower alkyl groups and R' is selected from the group consisting of hydrogen atoms and methyl groups, with an organic diol reactant having the structural formula:

HO-R''-OH where R'' is a divalent organic radical selected from the group consisting of alkylene radicals, arylene radicals, cycloalkylene radicals and ether radicals, wherein the polyester has an inherent viscosity in the range 0.25 to 1.25 and a sensitizer.

4. A photosensitive element as defined in claim 3 wherein the muconic acid reactant is selected from the group consisting of trans,trans-muconic acid, cis,trans-muconic acid, cis,cis-muconic acid, $\alpha$, $\alpha'$-trans,trans-dimethylmuconic acid, $\alpha$, $\alpha'$-cis,trans-dimethylmuconic acid, $\alpha$, $\alpha'$-cis,cis-dimethylmuconic acid and esters thereof and the diol reactant is selected from the group consisting of 1,4-butanediol, 1,5-pentanediol, 1,9-nonanediol, neopentyl glycol, 2,2-bis(4-hydroxyphenyl)-propane and 1,4-cyclohexanedimethanol.

5. A photosensitive element as defined in claim 3 wherein the photosensitive composition contains a sensitizer selected from the group consisting of thiazoles, pyrylium salts, and thiapyrylium salts.

6. A photosensitive element as defined in claim 3 wherein the support is a metal plate.

7. A photosensitive element as defined in claim 3 wherein the support is a polymeric film base.

8. A photosensitive element as defined in claim 3 wherein the muconic acid reactant is dimethyl- $\alpha$, $\alpha'$-trans,trans-dimethylmuconate and the diol reactant is selected from the group consisting of 1,4-butanediol, 1,5-pentanediol, and 1,9-nonanediol.

9. A photosensitive element comprising a support on which is coated a layer of a photosensitive composition comprising a light-sensitive linear polyester condensation product of dimethyl-$\alpha$, $\alpha'$-trans,trans-dimethylmuconate with 1,9-nonanediol and a sensitizing amount of 3-methyl-2-methylmercaptothiocarbonylmethylenebenzothiazoline, wherein the polyester has an inherent viscosity in the range 0.25 to 1.25.

10 A photosensitive element comprising a support on which is coated a layer of a photosensitive composition comprising a light-sensitive linear polyester condensation product of dimethyl-$\alpha$, $\alpha'$-trans,trans-dimethylmuconate with 1,5-pentanediol and a sensitizing amount of 1-methyl-2-benzoylmethylene-$\beta$-naphthothiazoline, wherein the polyester has an inherent viscosity in the range 0.25 to 1.25.

11. A photosensitive element comprising a support on which is coated a layer of a photosensitive composition comprising a light-sensitive linear polyester condensation product of dimethyl-$\alpha$, $\alpha'$-trans,trans-dimethylmuconate with 1,4-butanediol and a sensitizing amount of 2,6-bis(4-ethoxyphenyl)-4-(4-n-amyloxyphenyl)thiapyrylium perchlorate, wherein the polyester has an inherent viscosity in the range 0.25 to 1.25.

12. A process for preparing photographic images which comprises imagewise exposing to actinic radiation a photosensitive element which comprises a support having thereon a layer of a photosensitive composition comprising a light-sensitive linear polyester condensation product of a muconic acid reactant having the structural formula:

$$ROOC-\underset{R'}{\underset{|}{C}}=CH-CH=\underset{R'}{\underset{|}{C}}-COOR$$

where R is selected from the group consisting of hydrogen atoms and lower alkyl groups and R' is selected from the group consisting of hydrogen atoms and methyl groups with an organic diol reactant having the structural formula:

HO-R''-OH where R'' is a divalent organic radical having about two to 20 carbon atoms and a sensitizer, the polyester having an inherent viscosity in the range 0.25 to 1.25, to insolubilize and raise the tackifying point of the polyester in exposed areas, and developing an image with the exposed element.

13. A process as defined in claim 12 wherein developing an image is accomplished by heating the element to a temperature which is between the tackifying point of the lower melting unexposed areas and the higher melting exposed areas and transferring composition from the unexposed areas to a receiving sheet.